United States Patent
Koeppl et al.

(10) Patent No.: US 9,065,275 B2
(45) Date of Patent: Jun. 23, 2015

(54) DRIVING CIRCUIT FOR AN ELECTRIC MOTOR

(71) Applicant: Infineon Technologies Austria AG, Villach (AT)

(72) Inventors: Benno Koeppl, Markt Indersdorf (DE); André Roger, Munich (DE); Matthias Bogus, Munich (DE); Philip Georg Brockerhoff, Munich (DE)

(73) Assignee: INFINEON TECHNOLOGIES AUSTRIA AG, Villach (AT)

( * ) Notice: Subject to any disclaimer, the term of this patent is extended or adjusted under 35 U.S.C. 154(b) by 39 days.

(21) Appl. No.: 13/975,501

(22) Filed: Aug. 26, 2013

(65) Prior Publication Data

US 2015/0055258 A1 Feb. 26, 2015

(51) Int. Cl.
*H02P 6/14* (2006.01)
*H02H 7/08* (2006.01)

(52) U.S. Cl.
CPC ................... *H02H 7/0844* (2013.01)

(58) Field of Classification Search
USPC ............... 318/400.09, 400.1, 400.21, 400.25, 318/400.26, 400.27; 361/28, 54, 55, 59
See application file for complete search history.

(56) References Cited

U.S. PATENT DOCUMENTS

| | | | |
|---|---|---|---|
| 4,905,645 A * | 3/1990 | Bonse et al. | 123/198 D |
| 5,222,009 A | 6/1993 | Scharnick et al. | |
| 5,250,853 A * | 10/1993 | Bacigalupo | 327/142 |
| 5,414,339 A | 5/1995 | Masaki et al. | |
| 6,211,631 B1 | 4/2001 | Wilson-Jones et al. | |
| 6,320,731 B1 * | 11/2001 | Eaves et al. | 361/42 |
| 7,019,479 B2 | 3/2006 | Tobias et al. | |
| 8,466,636 B2 * | 6/2013 | Mazumdar | 318/34 |
| 2008/0054839 A1 | 3/2008 | Sasaki et al. | |
| 2010/0079095 A1 | 4/2010 | Shibata et al. | |
| 2013/0271888 A1 * | 10/2013 | Falk et al. | 361/93.1 |

FOREIGN PATENT DOCUMENTS

| | | |
|---|---|---|
| DE | 69322718 T2 | 8/1999 |
| DE | 10019736 A1 | 10/2001 |
| DE | 69712595 T2 | 8/2002 |
| DE | 102007024659 A1 | 11/2008 |
| DE | 102008021854 A1 | 11/2009 |
| WO | 2009132862 A1 | 11/2009 |
| WO | 2010116182 A1 | 10/2010 |

OTHER PUBLICATIONS

English Abstract of DE10019736 A1, dated Oct. 25, 2001.
English Abstract of DE102007024659 A1, dated Nov. 27, 2008.

* cited by examiner

*Primary Examiner* — Bentsu Ro
*Assistant Examiner* — Thai Dinh (57) ABSTRACT

In various embodiments a circuit arrangement is provided, having a bridge circuit including at least two switches connected in series; a bridge node which may provide a phase voltage arranged between the at least two switches; an electric motor having at least one phase winding coupled with the bridge node; a decoupling switch; a controller, wherein in an error case the controller may be configured to switch off the at least two switches, to determine whether a predefined condition is satisfied, and to one of delayed switching off the decoupling switch; and switching off the at least two switches and the decoupling switch simultaneously, depending upon whether the predefined condition is satisfied; wherein the controller may determine that the predefined condition is satisfied when the decoupling switch may be switched off without damage from the current applied to it when the at least two switches are switched off.

26 Claims, 3 Drawing Sheets

DRIVING CIRCUIT FOR AN ELECTRIC MOTOR

TECHNICAL FIELD

In various embodiments a driving circuit for an electric motor is provided.

BACKGROUND

Three-phase electric motors are frequently used, among other fields, in automotive applications. Some of the applications are safety applications where corresponding systems are required to enter into a fail-safe mode, even if the electronic entity controlling the system is no longer available, for example, when it is damaged and therefore not able to control the system any longer. In the case of the three-phase electric motor which may be used for electric steering in any kind of vehicle, it should still allow to turn the steering wheel in fail-safe mode. With an AC induction motor, i.e. an electric motor in which the magnetic field of the rotor is created by an induced current, this is not an issue. However, when an AC synchronous motor is used, such as a PMSM (permanent magnet synchronous motor), which allows to generate high torque from a compact and light mechanic system, there is the problem that even after the motor is shut down, for example due to a system error, the magnetic moment of the permanent magnet of the still spinning rotor will induce a current in the coils of the stator and, in effect, a torque will act back on the rotor. This may lead to situations in which the motor may be blocked and hence may not be turned. In order to avoid such states of the motor when a PMSM is used, it must be ensured that in fail-safe mode there is no current circulating in the windings of each of the phases. In order to satisfy this requirement, appropriate circuitry needs to be implemented for isolating the phases in a fail-safe mode. In early applications, isolating circuitry was based on mechanical relays. Nowadays, mechanical relays are predominantly replaced with solid state relays in the form of transistors which are arranged between the half bridges of the inverter and the individual phases of the electric motor. However, when solid state relays are used to isolate the phases, a substantial amount of energy which needs to be dissipated to shut off the system has to be dealt with. This energy may prove problematic in the sense that the solid state relays may be damaged in the fail-safe mode or, in order to prevent that from happening, expensive power components may have to be used.

SUMMARY

According to various embodiments a circuit arrangement is provided, having a bridge circuit including at least two switches connected in series; a bridge node arranged between the at least two switches, wherein the bridge node may be configured to provide a phase voltage; an electric motor having at least one phase winding coupled with the bridge node; a decoupling switch connected between the bridge node and the electric motor; a controller coupled with the decoupling switch and with the at least two switches, wherein in an error case the controller may be configured to switch off the at least two switches, to determine whether a predefined condition is satisfied, and to one of switching off the decoupling switch, wherein the switching off of the decoupling switch is delayed with respect to the switching off of the at least two switches in case the predefined condition is not satisfied; and switching off the at least two switches and the decoupling switch simultaneously, in case the predefined condition is satisfied; wherein the controller may be configured to determine that the predefined condition is satisfied when the decoupling switch may be switched off without suffering permanent damage from the current applied to it at the time when the at least two switches are switched off.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Figure 1:
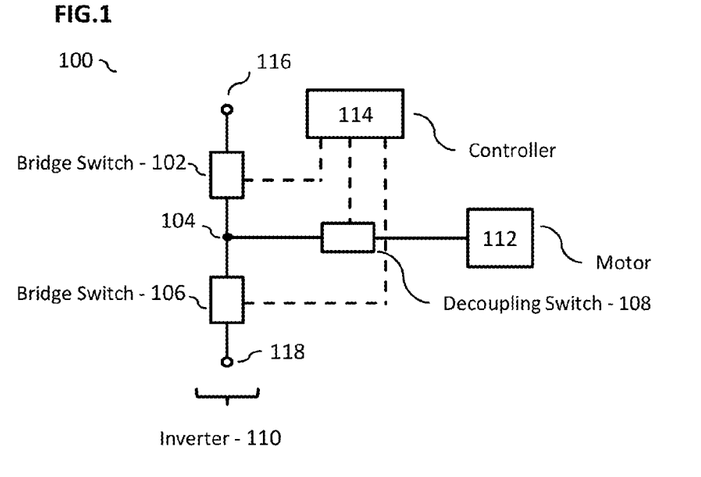
FIG. 1 shows a circuit arrangement according to various embodiments having one half bridge.

In FIG. 1 a circuit arrangement 100 according to various embodiments is shown. The circuit arrangement 100 according to various embodiments may include an inverter circuit 110 (bridge circuit) which may have at least two switches connected in series, i.e. a first switch 102 and a second switch 106. The first switch 102 and a second switch 106 may form a half bridge, such that the first switch 102 may be the high side switch and the second switch 106 may be the low side switch. The at least two switches 102, 106 (which in the following will be also referred to as bridge switches) may be configured as solid state switches, for example as transistors, for example as field effect transistors such as MOSFETs (metal-oxide-semiconductor field effect transistors). One terminal of the first switch 102 may be coupled to a first reference terminal 116 which may be at a first reference potential, for example a battery potential or any other kind of power supply potential, and one terminal of the second switch 106 may be coupled to a second reference terminal 118 which may be at a second reference potential, such as the ground potential. The difference between the first reference potential and the second reference potential defines the bridge voltage. A bridge node 104 may be arranged between the at least two bridge switches 102, 106 and may be configured to provide a phase voltage which may correspond to a sinusoidal phase voltage with an amplitude corresponding to the bridge voltage. The circuit arrangement 100 according to various embodiments may further include an electric motor 112 having at least one phase winding coupled with the bridge node 104 via a decoupling switch 108 connected between the bridge node 104 and the electric motor 112. The decoupling switch 108, in analogy to the at least two switches of the inverter circuit 110, may be configured as solid a state switch, for example as a transistor, for example as a field effect transistor such as a MOSFET. The circuit arrangement 100 according to various embodiments may further include a controller 114 coupled with the decoupling switch 108 and with the at least two bridge switches 102, 106, wherein in an error case the controller 104 may be configured to switch off the at least two bridge switches 102, 106 to determine whether a predefined condition is satisfied, and to either switch off the decoupling switch 108, wherein the switching off of the decoupling switch 108 is delayed with respect to the switching off of the at least two bridge switches 102, 106 in case the predefined condition is not satisfied, or to switch off the at least two bridge switches 102, 106 and the decoupling switch 108 simultaneously, in case the predefined condition is satisfied. The controller 114 may be configured to determine that the predefined condition is satisfied when the decoupling switch 108 may be switched off without suffering permanent damage from the current applied to it at the time when the at least two switches 102, 106 are switched off. It is to be noted that in contrary to the representation of the controller 114 as one entity in FIG. 1, it may as well include at least two separate modules which may be communicatively coupled with each other, wherein one module may be configured to control the at least two bridge switches 102,106 and the other module may be configured to control the decoupling switch 108.

The underlying idea on which the various embodiments of the circuit arrangement and a corresponding method to control the circuit arrangement may be based is a mechanism and/or a method by which an optimal point in time for the switching off of the decoupling switch 108 may be chosen, for example in an error case. This optimal switching off may be achieved by delaying the switching off of the decoupling switch 108 with respect to the switching off of the at least two bridge switches 102, 106 of the inverter circuit 110 or by switching off the decoupling switch 108 and the at least two bridge switches 102, 106 simultaneously. The decision whether the decoupling switch 108 is to be switched off simultaneously or in a delayed fashion with respect to the switching off of the at least two bridge switches 102, 106, is made by the controller 114. The controller 114 may be configured to assess at least one parameter and based on the outcome of that assessment it may be configured to switch off the at least two switches 102, 106 in an error case and simultaneously switch off the decoupling switch 108 or delay the switching off of the decoupling switch 108 by a certain time. The at least one parameter may include the rotation speed and/or relative position between the rotor and the stator of the electric motor 112 at the time of a shut down of the inverter circuit 110, the value of the phase current, the value of the phase voltage, the value of the first reference potential (e.g. the battery voltage), the kind of error condition (short circuit or open circuit, position thereof within the circuit arrangement 100 according to various embodiments). The phase current may refer to a current which may be drawn by or generated by the electric motor 112 at any time, i.e. during normal operation, i.e. during operation of the circuit arrangement according to various embodiments in which an error case is not present, or during operation thereof in an error case, i.e. after the at least two bridge switches 102, 106 have been switched off due to the detection of an error case.

In contrast to ordinary safety applications in which there is a paradigm that the system needs to be shut off as fast as possible in an error situation, the approach followed here may include cases, as already explained above, in which the decoupling switch 108 is not switched off simultaneously with the at least two bridge switches 102, 108, i.e. as fast as possible. In the automotive domain, safety applications usually have an application safety time. The application safety time, which may approximately lie in the range from about 10 ms to about 30 ms, is the time allowed for an application to detect any deviations from the normal operation state and/or any anomalous conditions before it enters into fail-safe mode. During that time the system dynamics may be uncontrolled and unpredictable. After the application safety time has passed, control of the system has to be regained and it can either return back to normal operation or enter into fail-safe mode. The controller 114 may be configured to monitor error conditions of the circuit arrangement 100 according to various embodiments, for example it may monitor error condition variables which may indicate if a certain error has occurred or not. In the case of an occurrence of an error, the controller 114 may use the application safety time to determine/estimate its possible effect on the system and then determine whether the decoupling switch 108 is to be switched off simultaneously with at least two bridge switches 102, 106 or whether the switching off of the decoupling switch 108 is to be delayed with respect to the switching off of the at least two switches 102, 106. In other words, the application safety time may be used for the estimation of the error and thereby be equivalent to an error estimate time.

The controller 114 may be also configured to react to errors taking place outside of the safety application, i.e. to errors taking place outside of the circuit arrangement 100 according to various embodiments. For this purpose, the controller 114 may include an external error terminal (not shown in FIG. 1) in order to receive an external error signal from the outside. When the external error signal is received, the controller 114 may be configured to enter the fail-safe mode even though no error is detected within the circuit arrangement 100 according to various embodiments. However, in that case the controller 114 may be also configured to determine an optimal point in time for the switching off of the decoupling switch 108 by delaying the switching off of the decoupling switch 108 with respect to the switching off of the at least two bridge switches 102, 106 of the inverter circuit 110 or by switching off the decoupling switch 108 and the at least two bridge switches 102, 106 simultaneously. In other words, when the external error signal is received according to which the circuit arrangement 100 according to various embodiments is to be switched off, the controller 114 may be configured to apply the same handling scheme as if an error case were detected within the circuit arrangement 100 according to various embodiments. Alternatively, the controller 114 may be configured to switch off the at least two bridge switches 102, 106 and the decoupling switch 108 of the inverter circuit 110 simultaneously and instantaneously when the external error signal is received according to which the circuit arrangement 100 according to various embodiments is to be switched off, provided that the decoupling switch may be switched off without being damaged by the phase current.

The circuit arrangement 100 according to various embodiments may be easily adapted to include more than one half bridge. For example, the circuit arrangement according to various embodiments may include a further branch in the form of a half bridge which may provide a further phase voltage, if the load requires two different phase voltages. In the following, a circuit arrangement 200 according to various embodiments including three half bridges will be described with reference to FIG. 2.

Figure 2:
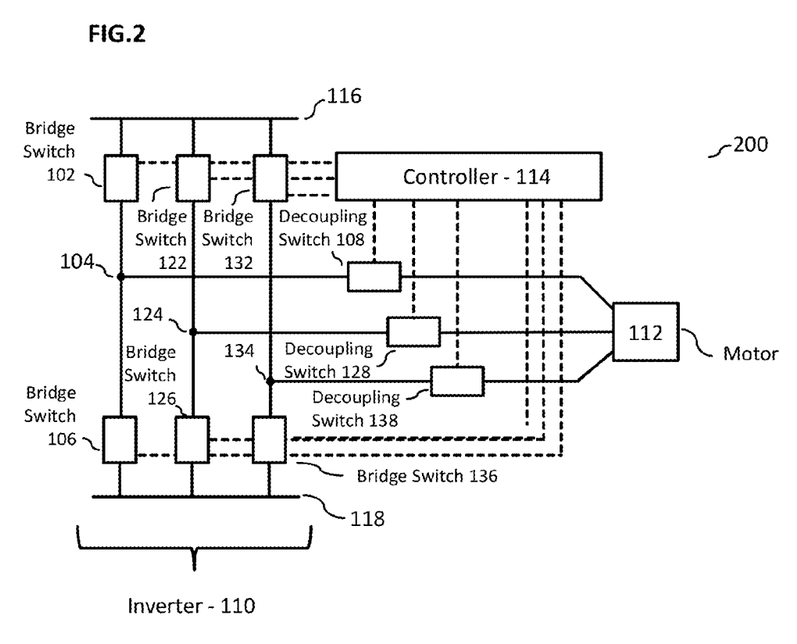
FIG. 2 shows a circuit arrangement according to various embodiments having three half bridges.

The circuit arrangement 200 according to various embodiments shown in FIG. 2 may be seen as an extension to the circuit arrangement 100 according to various embodiments shown in FIG. 1 in the sense that the inverter circuit 110 includes three half bridges instead of only one half bridge. Therefore, three different phase voltages are provided within the circuit arrangement 200 according to various embodiments and provided to the three phase windings within the electric motor 112. In the circuit arrangement 100 according to various embodiments shown in FIG. 1 a load requiring a single phase voltage may be assumed, for example a one phase electric motor 112, whereas a load requiring three phase voltages, such as a three-phase electric motor 112, may be assumed to be used in the circuit arrangement 200 according to various embodiments shown in FIG. 2. The circuit arrangement 200 shown in FIG. 2 may therefore be configured to provide three phase voltages to the electric motor 112, wherein each phase voltage may have a phase shift of 120° with respect to the other one.

In the following, the circuit arrangement 200 according to various embodiments will be described starting from the circuit arrangement 100 shown in FIG. 1 as the basis. In addition to the elements shown in FIG. 1, which will not be described again, the circuit arrangement 200 according to various embodiments may further include a second half bridge including a third switch 122 and a fourth switch 126. One terminal of the third switch 122 may be coupled to the first reference terminal 116 which may be at the first reference potential, for example a battery potential or any other kind of power supply potential, and one terminal of the fourth switch 126 may be coupled to the second reference terminal 118 which may be at the second reference potential, such as the ground potential. A second bridge node 124 may be arranged between the at least two bridge switches 122, 126 of the second half bridge and be configured to provide a second phase voltage to a second phase winding of the electric motor 112. The second phase winding of the electric motor 112 may be coupled with the second bridge node 124 via a second decoupling switch 128. The circuit arrangement 200 according to various embodiments may further include a third half bridge including a fifth switch 132 and a sixth switch 136. One terminal of the fifth switch 132 may be coupled to the first reference terminal 116 and one terminal of the sixth switch 136 may be coupled to the second reference terminal 118. A third bridge node 134 may be arranged between the two bridge switches 132, 136 of the third half bridge and be configured to provide a third phase voltage to a third phase winding of the electric motor 112. The third phase winding of the electric motor 112 may be coupled with the third bridge node 134 via a third decoupling switch 138. In analogy to the switches described with respect to FIG. 1, the bridge switches of the second half bridge and of the third half bridge may be configured as solid a state switches, for example as transistors, for example as a field effect transistors such as MOSFETs.

As shown in FIG. 2, the controller 114 is coupled with every bridge switch 102, 106, 122, 126, 132, 136 provided within the three half bridges of the inverter circuit 110 and with every one of the three decoupling switches 108, 128, 138. Independent of the number of half bridges within the inverter circuit 110, the controller 114 may be configured to switch off the all of the bridge switches within the inverter circuit 110 in an error case, to determine whether a predefined condition is satisfied, and to either delay the switching off the decoupling switches 108, 128, 138 with respect to the switching off of the bridge switches 102, 106, 122, 126, 132, 136 in case the predefined condition is not satisfied or to switch off the bridge switches 102, 106, 122, 126, 132, 136 and the decoupling switches 108, 128, 138 simultaneously in case the predefined condition is satisfied. Also, independent of the number of half bridges present in the inverter circuit 110, the controller 114 may be configured to determine that the predefined condition is satisfied when the decoupling switches may be switched off without suffering permanent damage from the phase current applied to them at the time when the bridge switches 108, 128, 138 are switched off.

In the following, possible error scenarios will be discussed with reference to FIG. 4 and their influence on the switching off strategy of the circuit arrangement according to various embodiments which is controlled by the controller 114. The description will be based on a circuit arrangement according to various embodiments including the half bridges in the inverter circuit 110 (as shown in FIG. 2). However, it may be analogously applied to circuit arrangements with inverter circuits 110 including only one half bridge or two half bridges.

Figure 4:
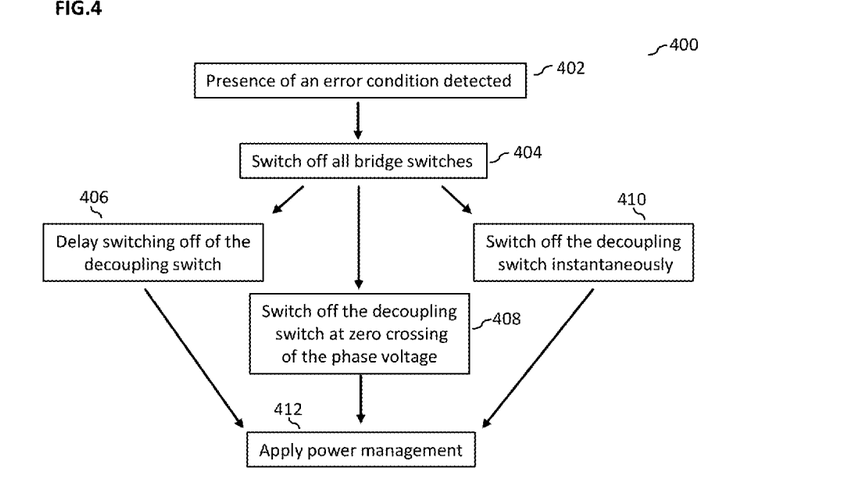
FIG. 4 shows a flow diagram illustrating a process flow describing the configuration of the controller within the circuit arrangement according to various embodiments.

In FIG. 4 a flow diagram 400 is shown illustrating the process flow initiated by the controller 114 upon a detection of the presence of an error condition in step 402. The presence of the error condition may be due to an error detected by the controller 114 within the circuit arrangement according to various embodiments itself. Alternatively, the external error signal which may be received by the controller 114 may prompt the circuit arrangement to enter into fail-safe mode. In both cases, the controller 114 is configured to shut off the system in a way which may minimize the risk of the bridge switches and/or the decoupling switches suffering permanent damage.

When the presence of an error condition in the circuit arrangement according to various embodiments is detected, two scenarios may need to be handled. In one scenario, a short circuit occurs in any one of the bridge switches. A short circuit in any bridge switch is assumed to provide an electrical path with negligible ohmic resistance through that bridge switch. A short circuit in any one of the bridge switches may be detected by monitoring the voltage across and/or the phase current flowing through the other bridge switch in a respective half bridge. When the other bridge switch is switched on, there will be a short between the first reference potential and the second reference potential which may be detected. In a further scenario, an open circuit occurs in any one of the bridge switches. An open circuit in any bridge switch is assumed to be equivalent to an infinite resistance such that no phase current flow is admitted therethrough. An open circuit in any one of the bridge switches may be detected by monitoring the phase voltage at the corresponding bridge node. When the bridge switches are switched off in an error case and the rotor of the electric motor 112 keeps revolving, a phase current is still generated and forced towards the decoupling switch and/or the corresponding bridge node or drawn therefrom. In some cases, however, due to the inductances provided in the electric motor 112, a phase current may be still generated (induced) on timescales of up to several hundreds of microseconds even after the electric motor 112 has stopped revolving. The phase voltage may then assume values outside of the voltage range of the bridge voltage. By monitoring the phase voltages the controller 114 may therefore be able to determine whether an open circuit is present a bridge switch in a respective half bridge. In both cases, the presence of an open circuit or the presence of a closed circuit in any one of the bridge switches also encompasses the cases in which an open circuit or a closed circuit is present at the periphery of the bridge circuit and affects the electrical connections between the respective bridge circuit and other electrical components.

When an error condition is detected by the controller 114 or when an appropriate value of the external error signal is received by the controller 114, all the bridge switches may be switched off in step 404 in the flow diagram 400. In case of an open circuit being present in any one of the bridge switches, that bridge switch may remain switched on as it may not be possible to actively switch that bridge switch off by the means of corresponding switching signals applied to it by the controller 114.

When the bridge switches are switches off, the controller 114 is configured to decide whether the decoupling switches may be switched off instantaneously (i.e. at the same time as the bridge switches) or whether their switching off should be delayed in order to prevent the decoupling switches from being damaged. As the controller 114 may have information about the position and rotation speed of the rotor of the electric motor 112, it may calculate/predict whether the bridge switches and the decoupling switches may be switched off at the same time. The value of each of the phase currents which in general may have a sinusoidal shape may be known to the controller 114 at the time of the detection of the short circuit at a bridge switch. Therefore, the controller 114 may be configured to switch off all decoupling switches instantaneously in step 406, i.e. at the same time as the bridge switches, when it determines that the decoupling switches are robust enough to withstand an overvoltage condition which may be caused by an excessive phase current. That is, if the phase current may be effectively blocked by the decoupling switches without them getting permanently damaged, the controller 114 may switch off the decoupling switches together with the bridge switches.

However, if the controller 114 determines that the decoupling switches are not robust enough to withstand an overvoltage condition which may be caused by an excessive phase current, it may delay the switching off of the decoupling switches, for example until a zero crossing of the corresponding phase voltage in step 408. A zero voltage crossing may be detected by a phase voltage feedback which may be included in the controller 114 or be provided in the circuit arrangement according to various embodiments as a separate entity. The phase voltage feedback may be configured as a comparator circuit which is configured to compare half the inverter circuit voltage (i.e. half the bridge voltage), which may correspond to a 12V of a vehicle battery, with the actual phase voltage, i.e. the voltage at a respective bridge node. A positive value of that comparison may indicate that the upper electric path is currently used, i.e. that the corresponding phase winding is electrically coupled to the first reference terminal 116, wherein a freewheeling electric path (e.g. a freewheeling diode) of the corresponding high side switch may be used. A negative value of that comparison may indicate that the lower electric path is currently used, i.e. that the corresponding phase winding is electrically coupled to the second reference terminal 118, wherein a freewheeling electric path (e.g. a freewheeling diode) of the corresponding low side switch may be used. By triggering the switching off of a respective decoupling switch on the transition between those two states, the controller 114 may be able to switch of the respective decoupling switch at a zero crossing of the corresponding phase current. However, if the phase currents are decaying, all three decoupling switches may also be switched off at the occurrence of a zero crossing of one phase currents, if the controller 114 is able to determine (for example from a theoretical model or from a lookup table) that the decay of the phase currents is so fast that there is no danger for the other decoupling switches of suffering permanent damage when switched off at the zero crossing of the phase current of the other decoupling switch. In such a case, only one decoupling switch will be switched off at the zero crossing of the corresponding phase current, the other two will be switched off at values of their phase currents other than zero. It is to be noted that the freewheeling path through the body diode of a bridge switch may be unavailable after an open circuit has occurred at the corresponding bridge switch. The phase voltage may not be clamped to the value of one body diode threshold voltage above the bridge voltage or to the value of one body diode threshold voltage below the reference voltage any more. Therefore, an excessively large phase voltage, either positive, for example a phase voltage above 20 V (instead of approximately, during normal operation of the circuit arrangement according to various embodiments, a value corresponding to the bridge voltage plus the threshold voltage of a body diode of the corresponding high side switch) or negative, for example a phase voltage below −20 V (instead of approximately, during normal operation of the circuit arrangement according to various embodiments, a value corresponding to the reference voltage minus the threshold voltage of a body diode of the corresponding low side switch) may be an indicator of a presence of an open circuit at the corresponding bridge switch (i.e. a high side switch or a low side switch), which the controller 114 may be further configured to detect for diagnostic purposes.

In another scenario represented by step 406, the controller 114 may delay the switching off of the decoupling switches until the phase current still generated by the electric motor 112 decays below a certain threshold value. The threshold value may be defined or based on the rated maximum operating parameters of the bridge switches.

In general, delaying the switching off of the decoupling switches may allow the phase current to decay to values low enough to be effectively blocked by low power switches which are usually cheaper, such as transistors designed for switching of low powers instead of expensive power transistors.

When the bridge switches and/or the decoupling switches are configured as semiconductor switches, for example MOSFETs, the overvoltage condition referred to above may be a condition in which a respective semiconductor switch is operated outside of its rated maximum operating values. For example, the overvoltage condition referred to above may correspond to an operation of a respective semiconductor switch the avalanche mode. Therefore, the decision made by the controller 114 whether a respective decoupling switch may be switched off at a given phase current applied to it may be based on the estimation whether or not the respective decoupling switch will enter into avalanche mode and if it will, whether the respective decoupling switch will be able to sustain the operation in avalanche mode and not be permanently damaged thereby. The controller 114 may be configured to predict the further temporal development of the phase current, for example, based on theoretical models using available parameters such as rotation speed of the rotor in the electric motor 112, relative position between the rotor and the stator of the electric motor 112, magnetic field of the rotor and/or internal resistance of the electric motor 112. However, actual measurements of the phase current may be also used for the prediction of the further temporal development thereof, as the required measurement circuits (e.g. Hall sensors, shunt resistors) are usually present in ordinary motor control circuits. Alternatively, the controller 114 may use lookup tables which may contain information whether a respective decoupling switch may be switched off at a given phase current or at a given rotation speed of the rotor and/or a given relative position between the rotor and the stator of the electric motor 114. In other words, the lookup tables may contain values based on already precalculated scenarios which take into account the specific design of the electric motor 112 as well as rated operating parameters of the semiconductor switches.

After the controller 114 has initiated any one of the processes according to steps 406, 408, 410 in the flow diagram 400, it may be configured to further apply power management. The goal of the power management may be seen in the distribution of the energy to be dissipated such that none of the bridge switches and decoupling switches will be damaged. The energy to be dissipated originates from the electric motor 112 in which the rotor does not stop instantaneously but continues rotating after the bridge switches have been switched off and thereby continues to induce a phase current in the stator. The switching off of the decoupling switches aims at blocking that phase current by separating the inverter circuit 110 from the electric motor 112. It may also protect the bridge switches from being damaged by an increased phase voltage and/or the phase current. However, instead of using high power switches that may be switched off at any time, the approach in the circuit arrangement according to various embodiments is to use low power switches to block currents which may lie outside the rated operation range of the switches. Therefore, redistribution schemes for the energy to be dissipated may be implemented to prevent the decoupling switches from being damaged.

By switching off the bridge switches, the phase voltage in at least one half bridge within the inverter circuit 110 may rise above its nominal value. When the decoupling switches are switched off, this increased phase voltage may lead to overvoltage conditions, i.e. to operation in avalanche mode in case of decoupling switches configured as MOSFETs. The power management employed by the controller 114 aims at a distribution of the energy to be dissipated in order to relieve the electric (and thereby thermal) stress on the switch(es) which is (are) blocking the current path between the electric motor 112 and the inverter circuit 110. When the switches (be it bridge switches or decoupling switches) are configured as semiconductor switches, for example as transistors such as MOSFETs, it may be said that the power management aims at a distribution of avalanche energy to different transistors. Within the scope of this description the avalanche energy may refer to the energy which is dissipated at a transistor during its operation in avalanche mode, wherein the energy may be dissipated in the form of heat generated in the transistor. In other words, the avalanche energy may refer to the amount of power over time the transistor itself may absorb and dissipate during operation in avalanche mode.

One measure to employ power management may be the simultaneous switching off of several decoupling switches, as already indicated in step 410 of the flow diagram 400 shown in FIG. 4. By doing so, several decoupling switches actively block the circulation current in the circuit arrangement according to various embodiments instead of only one decoupling switch and therefore the energy to be dissipated is distributed among those.

A further measure to employ power management may be the switching on of a switch (be it a bridge switch or a decoupling switch) which is operating in overvoltage condition. Thereby, that switch will no longer actively block the current path and it may stop to operate in an overvoltage condition. Its blocking property will be then taken over by the other switch(es) in the respective half bridge (including the corresponding decoupling switch). The switch which may be switched on may be the switch in which the highest avalanche energy has been dissipated compared to other switches which may also operate in avalanche mode. The switch which may be switched on may be the switch in which a predefined avalanche energy has been dissipated which may correspond. That predefined avalanche energy may correspond to a maximum rated dissipated energy (taking into account a safety margin) which the switch may sustain without suffering permanent damage.

A yet further measure to employ power management may include a switching scheme in which the at least one switch which is stressed the most by overvoltage is switched on and off with a certain frequency or at variable intervals in order to have alternating phases of thermal stress and thermal relaxation. For example, a PWM (pulse width modulation) scheme may be used. By switching on and switching off a semiconductor switch, for example, the avalanche energy may be dosed in accordance with the maximum rated operating parameters of the semiconductor switch. It is assumed that when a semiconductor switch is operating in avalanche mode, it is under high thermal stress and therefore in a phase of thermal stress. Consequently, it is assumed that when a semiconductor switch is not operating in avalanche mode, i.e. not switched off and blocking the phase current, it is under low (er) thermal stress and therefore in a phase of thermal relaxation.

In the following, the power management employed by the controller 114 will be explained on the basis of the circuit arrangement 200 according to various embodiments shown in FIG. 2. For the purpose of illustration only it is assumed that the switches, i.e. the six bridge switches 102, 106, 122, 126, 132, 136 and the three decoupling switches 108, 128, 138 are configured as transistors, for example MOSFETs. For the purpose of illustration only it is further assumed that the error condition is due to an open circuit which is present in the third switch 122, i.e. the high side switch of the second half bridge.

When the controller 114 detects the open circuit in the third switch 122, all the other bridge switches 102, 106, 126, 132, 136 are switched off in accordance with step 404 of the process flow shown in the flow diagram 400 of FIG. 4. Then, depending on the magnitude of the phase current, the decoupling switches 108, 128, 138 are switched off. In the meantime, the fourth bridge switch 126 may have operated in avalanche mode as the freewheeling path towards the first reference terminal 116, e.g. through a freewheeling diode in the third bridge switch 122, is unavailable and therefore the phase current may have generated a significant potential increase at the second bridge node 124 such that the fourth bridge switch 126 may not have been able to effectively block the voltage between the fourth bridge node 124 and the second reference terminal 118 and, in effect, entered into avalanche mode. A simultaneous switching off of all three decoupling switches 108, 128, 138 will lead to a distribution of the voltage stress, for example of the avalanche energy, for example from the fourth bridge switch 126 to at least one and to maximally two of those three decoupling switches. It is to be mentioned that depending on the direction of the phase current, at least one and maximally two of the three decoupling switches 108, 128, 138 may enter into avalanche mode.

Figure 3:
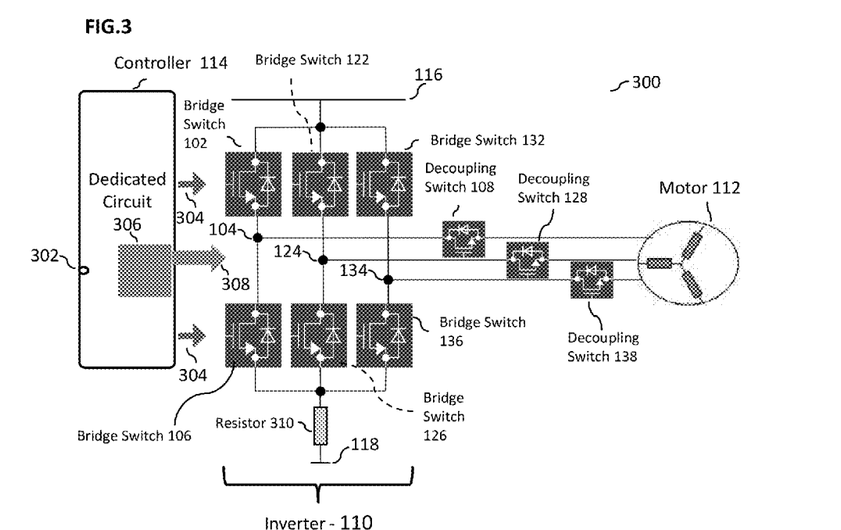
FIG. 3 shows a further circuit arrangement according to various embodiments having three half bridges.

The at least one other decoupling switch may conduct the phase current via its freewheeling path, e.g. a freewheeling diode (which may be provided in each one of the decoupling switches in the form of an inherent body diode of a MOSFET). In this example, the fourth bridge switch 126, the first decoupling switch 108 and/or the third decoupling switch 138 may be switched on alternately to apply a power management scheme which may aim at letting the switch which is switched on recover from thermal stress during the time period in which remains switched on and therefore is not used to block the phase current. In general, if the controller 114 determines that the stress from the phase current on at least one of the decoupling switches 108, 128, 138 or at least one of the bridge switches is too high, that decoupling switch or that bridge switch may be switched on for a period of time during which it may recover. For the purpose of illustration only it is assumed that the first decoupling switch 108 is running the risk of being damaged by excessive avalanche energy being dissipated thereat. When the first decoupling switch 108 is configured as a MOSFET with a body diode arranged in the direction as shown in FIG. 3, this may only be the case if the current is flowing from the second reference terminal 118 through the first bridge node 104 towards the electric motor 112, since then the freewheeling electric path through the body diode of the first decoupling switch 108 will not be available for this current flow direction. Hence, the potential between the first bridge node 104 and the first decoupling switch 108 may increase substantially leading to a large voltage being applied across the first decoupling switch 108. In consequence, the first decoupling switch 108 may enter into operation in avalanche mode. In order to prevent damaging of the first decoupling switch 108, it may be switched on for a certain period of time. In this example there might be a current flow as well from the motor 112 towards the second bridge node 124 and the third bridge node 134. The current flowing towards the third bridge node 134 will flow through the conducting body diodes of the third decoupling switch 138 and the fifth bridge switch 132 to the first reference terminal 116, e.g. the battery. The current flowing towards the second bridge node 124 will flow through the conducting body diode of the second bridge switch 128. As in this exemplary scenario the third bridge switch 122 is affected by an open circuit, that current will be prevented from flowing towards the first reference terminal 116. Instead, it may drive the fourth bridge switch 126 into avalanche mode. This means that in this example the first decoupling switch 108 and the fourth bridge switch 126 may be affected by severe thermal load. By switching on the first decoupling switch 108 or the fourth bridge switch 126 in an exclusive manner, a power management between the two switches affected by severe thermal load may be achieved. During this process, the battery may be charged as current is flowing from the second reference terminal 118 to the first reference terminal 116 through the electric motor 112. During this process the current will not be increased, however the phases during which the first decoupling switch 108 is switched on may prolong the time it takes for the current to decay. After a certain time, e.g. after the first decoupling switch 108 has recovered, i.e. cooled off, it may be switched off again thereby effectively blocking the electrical path for the phase current again. The first decoupling switch 108 may be switched on and off for variable periods of time, for example in a PWM scheme as the amount of phase current generated by the electric motor 112 may require several stress and relaxation phases of the decoupling switch 108 until all of its rotational energy is dissipated and it eventually stops its rotating motion.

The procedures just described may be applied to every other branch of the circuit arrangement 200 according to various embodiments, i.e. to the second branch including the second half bridge (third switch 122 and the fourth switch 126) and the second decoupling switch 128 and/or to the third branch including the third half bridge (fifth switch 132 and the sixth switch 136) and the third decoupling switch 138 independently from one another. For example, if the second decoupling switch 128 and the third decoupling switch 138 are to be switched on and off repeatedly, for example with a PWM scheme, they may be switched on and off synchronously or they may be switched on and off independently from one another.

In FIG. 3 a further implementation 300 of a circuit arrangement according to various embodiments is shown. The implementation 300 is based on the circuit arrangement 200 shown in FIG. 2. Each switch, i.e. the six bridge switches 102, 106, 122, 126, 132, 136 and the three decoupling switches 108, 128, 138 are configured as MOSFETs, each including the inherent body diode which may be used as freewheeling diode when the respective switch is switched off. It is to be noted that the arrangement of the body diodes of the three decoupling switches 108, 128, 138 may be inverted, i.e. the direction of the freewheeling path may be inverted. In the implementation 300 of the circuit arrangement according to various embodiments, a resistor 310 is shown which is coupled between the second reference terminal 118 and the low side switches of the inverter circuit 110. The resistor 310 may be a shunt resistor which may be used to determine the magnitude of the phase current. Its arrangement as shown in FIG. 3 is an exemplary one, the shunt resistor or multiple shunt resistor may be provided between at other positions within the circuit arrangement 300 according to various embodiments, e.g. in any one of the electric paths between any one of the decoupling switches 108, 128, 138 and the electric motor 112. The explicit connections between the controller 114 and the switches have been omitted from the figure for the sake of clarity. In the embodiment shown in FIG. 3, the controller 114 includes a dedicated circuit 306 which is configured to monitor the error conditions and decide when to switch off the decoupling switches in an error condition. The small arrows 304 indicate the effect of the controller 114 on the bridge switches, which are switched off in the event of a detected or reported error condition. The big arrow 308 indicates the effect of the dedicated circuit 306 on the decoupling switches, which may be either switched off together or delayed respect to the switching off of the bridge switches, as was explained on the basis of the flow diagram 400 shown in FIG. 4. The controller 114 further includes the external error terminal 302 via which it may receive the external error signal indicating that the bridge circuit within the circuit arrangement 300 according to various embodiments is to be shut down. In general, the controller 114 may receive signals indicating the phase voltages and/or the voltages applied across the bridge switches in order to determine short circuits at the bridge switches. The direction of the phase current will determine whether the phase current flows through the high side switch or through the low side switch of the respective half bridge of the circuit arrangement according to various embodiments. A transition from a current flow through the high side switch to a current flow through the low side switch and vice versa in a given half bridge will alter the phase voltage and thereby indicate a zero crossing of the phase current.

Overlooking the embodiment shown in FIG. 3, the freewheeling diodes which are basically unidirectional electrical pathways which are always conductive when a voltage above the diode forward voltage of the correct polarity is applied to them. This fact has to be considered during the power management scheme, where it may not always be possible to open a decoupling switch which is thermally stressed by avalanche operation as this may result in a readily conductive electrical path between the electric motor 112 and the reference potentials.

Figure 5:
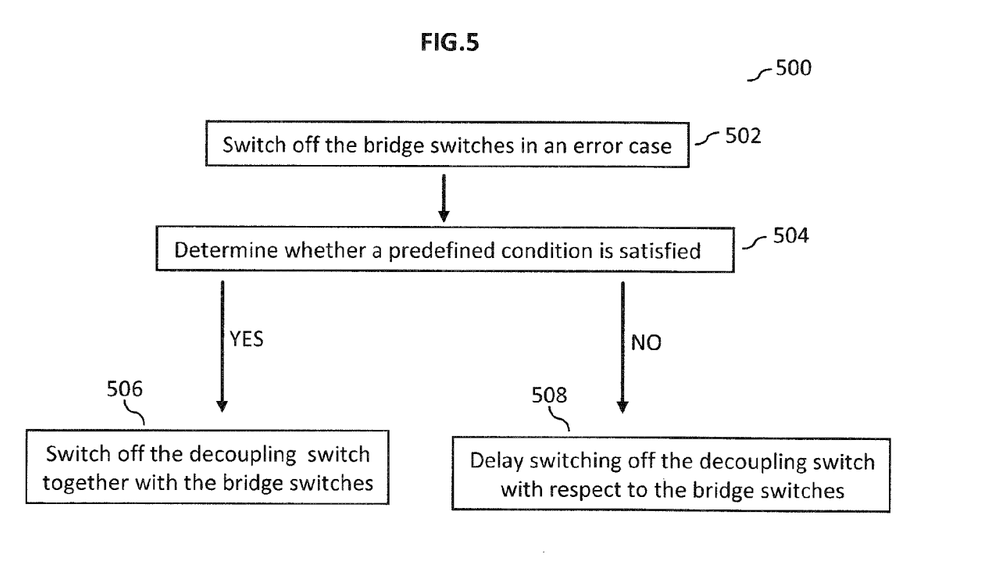
FIG. 5 shows a flow diagram illustrating a method to operate a circuit arrangement according to various embodiments.

In FIG. 5 a flow diagram 500 is shown illustrating a method to operate the circuit arrangement according to various embodiments. In step 502 the method may include switching off the at least two switches (bridge switches) in an error case. It is to be mentioned that if a short circuit is present in a bridge circuit, it may not be possible to actively switch off that switch by means of an appropriate signal for the controller 114. In such a case, the affected bridge switch will remain conducting.

In a next step 504 the method may include determining whether a predefined condition is satisfied. As previously mentioned, the predefined condition is satisfied when the decoupling switch (or the decoupling switches) may be switched off without suffering permanent damage from the current applied to it (or them) at the time when the at least two switches (bridge switches) are switched off.

If that condition is not satisfied, the method may include delaying the switching off the decoupling switch (or the decoupling switches) with respect to the switching off of the at least two switches (bridge switches) in step 508. In case of a circuit arrangement according to various embodiments having more than one branch, i.e. more than one half bridge, the individual decoupling switches may be switched off simultaneously (but still some time after the bridge switches have been switched off) or delayed individually by different times such that they are not switched off at the same time.

If that condition is satisfied, the method may include switching off the at least two switches (bridge switches) and the decoupling switch (or the decoupling switches) simultaneously in step 506.

The circuit arrangement according to various embodiments as described herein as well as the method for the operation thereof may be, to name one viable example, be used in power assisted steering applications, for example in any kind of vehicles.

The detection of error conditions, for example the first error case and the second error case, within the circuit arrangement according to various embodiments may be based on monitoring whether currents and/or voltages exceed or undercut certain thresholds, for example the second threshold value and the third threshold value. The values of the thresholds may be chosen such that the presence of an error condition may be practically guaranteed when a respective threshold is exceeded or undercut by the monitored value.

However, instead of monitoring certain values such as the phase current and/or the phase voltage in order to determine whether an error condition is present, test patterns may be used instead or in addition. In other words, the reaction of the circuit arrangement according to various embodiments to test patterns, for example certain control pulses applied to the switches, may be analysed in order to detect error cases. To name one example, a bridge switch or a decoupling switch may be switched on or off by an appropriately configured control signal. If upon application of an activating or deactivating control signal to that switch no change of the phase current or the phase voltage in the corresponding half bridge is detected, that switch may be classified as being affected by an open circuit and therefore being faulty.

In accordance with various embodiments a circuit arrangement is provided, including a bridge circuit comprising at least two switches connected in series; a bridge node arranged between the at least two switches, wherein the bridge node may be configured to provide a phase voltage; an electric motor having at least one phase winding coupled with the bridge node; a decoupling switch connected between the bridge node and the electric motor; a controller coupled with the decoupling switch and with the at least two switches, wherein in an error case the controller may be configured to switch off the at least two switches, to determine whether a predefined condition is satisfied, and to either switch off the decoupling switch, wherein the switching off of the decoupling switch may be delayed with respect to the switching off of the at least two switches in case the predefined condition is not satisfied; or to switch off the at least two switches and the decoupling switch simultaneously, in case the predefined condition is satisfied; wherein the controller may be configured to determine that the predefined condition is satisfied when the decoupling switch may be switched off without suffering permanent damage from the current applied to it at the time when the at least two switches are switched off.

According to further embodiments of the circuit arrangement a first switch of the at least two switches may be coupled to a supply potential.

According to further embodiments of the circuit arrangement a second switch of the at least two switches may be coupled to a reference potential.

According to further embodiments of the circuit arrangement the controller may be configured to determine that the predefined condition is satisfied when the decoupling switch is robust enough to withstand an overvoltage condition caused by the potential difference between the bridge node and the phase winding.

According to further embodiments of the circuit arrangement the decoupling switch may be configured as a field effect transistor.

According to further embodiments of the circuit arrangement the controller may be configured to determine that the predefined condition is satisfied when the decoupling switch is able to withstand operation in avalanche mode induced therein by the potential difference between the potential at the bridge node and the potential at the phase winding.

According to further embodiments of the circuit arrangement the controller may be further configured to determine the potential at the phase winding from the position of a stator with respect to a rotor of the electric motor.

According to further embodiments of the circuit arrangement the controller may be further configured to monitor the phase voltage.

According to further embodiments of the circuit arrangement the controller may be further configured to delay the switching off of the decoupling switch with respect to the switching off of the at least two switches until a zero crossing of the phase voltage or the phase current.

According to further embodiments of the circuit arrangement the controller may be further configured to delay the switching off of the decoupling switch with respect to the switching off of the at least two switches until the value of a current driven by the electric motor towards the bridge node has decreased below a first threshold value. The first threshold value may be defined by or based on the rated operating parameters of the switches and indicate a current at which a safe switching off of the at least two switches may still be possible, e.g. a switching off by which the at least two switches may not be damaged due to the current (phase current) still driven by the electric motor from or towards the bridge node.

According to further embodiments of the circuit arrangement the first threshold value of the current fed back from the electric motor towards the bridge node may include an average current value or an instantaneous current value.

According to further embodiments of the circuit arrangement the first threshold value the value of the current fed back from the electric motor towards the bridge node may include an instantaneous value.

According to further embodiments of the circuit arrangement a first error case may correspond to a short circuit being present at any one of the at least two switches.

According to further embodiments of the circuit arrangement the controller may be further configured to monitor the voltage across at least one of the at least two switches.

According to further embodiments of the circuit arrangement the controller may be further configured to detect the first error case when the voltage across at least one of the at least two switches exceeds a second threshold value while being switched on. The second threshold value may be defined by or may correspond to (possibly taking into account a safety margin) the resistance of the corresponding switch in fully conducting state ($R_{DS(on)}$ in the case of a MOSFET transistor) multiplied with the maximum allowed phase current.

According to further embodiments of the circuit arrangement a second error case may correspond to an open circuit being present at any one of the at least two switches.

According to further embodiments of the circuit arrangement the controller may be further configured to detect the second error case when the phase voltage exceeds or undercuts a third threshold value. The third threshold value may correspond to the bridge voltage (i.e. the voltage at the first reference potential 116) plus a diode forward voltage and plus a safety margin to reliably detect an open circuit condition in a respective high side bridge switch or it may correspond to the second reference voltage (i.e. voltage at the second reference terminal 118) minus a diode forward voltage and minus a safety margin to reliably detect an open circuit condition in a low side bridge switch.

According to further embodiments of the circuit arrangement the decoupling switch may be configured as a field effect transistor and the controller may be further configured to switch the decoupling switch back on after it has remained switched off due to the second error case and has operated in avalanche mode for a period of time during which a portion of energy has been dissipated therein corresponding to or being smaller than its maximally rated dissipated portion of energy.

According to further embodiments of the circuit arrangement the controller may be further configured to drive the decoupling switch, after it has been switched off due to the second error case, in a clocked manner such that it is switched on and switched off in succession.

According to further embodiments of the circuit arrangement the controller may be configured to drive the decoupling switch in the clocked manner such that a portion of energy that is dissipated therein during the time it remains switched off and operates in avalanche mode corresponds to or is smaller than its maximally rated dissipated portion of energy. The maximally rated dissipated portion of energy may be the portion of energy that may be dissipated in the switch without the switch taking any permanent damage, for example due to melting through overheating.

According to further embodiments the circuit arrangement may further include two further switches connected in series and provided in the bridge circuit; a further bridge node arranged between the further two switches, the further bridge node being configured to provide a further phase voltage; a further decoupling switch coupled between the further bridge node and a further phase winding of the electric motor, wherein the controller may be coupled with the further decoupling switch and the two further switches; wherein in the error case the controller may be configured to switch off the at least two switches together with the further two switches; and to either switch off the further decoupling switch, wherein the switching off of the further decoupling switch may be delayed with respect to the switching off of the switches in case the predefined condition is not satisfied, or switch off the further decoupling switch and the switches simultaneously in case the predefined condition is satisfied, wherein the controller may be configured to determine that the predefined condition is satisfied when the further decoupling switch may be switched off without suffering permanent damage from the current applied to it at the time when the at least two switches are switched off.

According to further embodiments of the circuit arrangement a first error case may correspond to a short circuit being present at any one of the switches.

According to further embodiments of the circuit arrangement the controller may be further configured to monitor the voltage across at least one of the switches.

According to further embodiments of the circuit arrangement the controller may be further configured to detect the first error case when the voltage across at least one of the switches exceeds a second threshold value.

According to further embodiments of the circuit arrangement a first switch of the further two switches may be coupled to a supply potential.

According to further embodiments of the circuit arrangement a second switch of the further two switches may be coupled to a reference potential.

According to further embodiments of the circuit arrangement a second error case may correspond to an open circuit being present at any one of the switches.

According to further embodiments of the circuit arrangement the controller may be further configured to monitor the further phase voltage.

According to further embodiments of the circuit arrangement the controller may be configured to detect the second error case when the further phase voltage exceeds or undercuts a third threshold value. The third threshold value may correspond to the bridge voltage (i.e. the voltage at the first reference potential 116) plus a diode forward voltage and plus a safety margin to reliably detect an open circuit condition in a respective high side bridge switch or it may correspond to the second reference voltage (i.e. voltage at the second reference terminal 118) minus a diode forward voltage and minus a safety margin to reliably detect an open circuit condition in a low side bridge switch.

According to further embodiments of the circuit arrangement the controller may be configured to determine that the predefined condition is satisfied when the decoupling switches are robust enough to withstand an overvoltage condition caused by the corresponding potential difference between bridge node and phase winding.

According to further embodiments of the circuit arrangement the decoupling switches may be configured as field effect transistors and the controller may be configured to determine that the predefined condition is satisfied when the decoupling switches are able to withstand operation in avalanche mode induced therein by the respective potential difference between bridge node and phase winding.

According to further embodiments of the circuit arrangement the controller may be configured to determine that the predefined condition is not satisfied if the further decoupling switch is not robust enough to withstand an overvoltage condition caused by the potential difference between the potential at the further bridge node and the potential at the further phase winding.

According to further embodiments of the circuit arrangement the decoupling switches may be configured as field effect transistors; and the controller may be configured to determine that the predefined condition is not satisfied if the further decoupling switch is not able to withstand operation in avalanche mode induced therein by the potential difference between the potential at the further bridge node and the potential at the further phase winding.

According to further embodiments of the circuit arrangement the controller may be configured to delay the switching off of the further decoupling switch with respect to the switching off of the switches until a zero crossing of the further phase voltage or a further phase current.

According to further embodiments of the circuit arrangement the controller may be further configured to delay the switching off of the further decoupling switch with respect to the switching off of the switches until the value of a current fed back from the electric motor towards the further bridge node has decreased below a first threshold value.

According to further embodiments of the circuit arrangement the first threshold value of the current fed back from the electric motor towards the further bridge node may include an average current value.

According to further embodiments of the circuit arrangement the first threshold value the value of the current fed back from the electric motor towards the further bridge node may include an instantaneous value.

According to further embodiments of the circuit arrangement the decoupling switches may be configured as field effect transistors and the controller may be further configured to switch that decoupling switch back on which, after being switched off due to the second error case, has operated in avalanche mode the longest.

According to further embodiments of the circuit arrangement the controller may be configured to switch that decoupling switch back on which, after being switched off due to the second error case, the phase voltage applied to has been the largest.

According to further embodiments of the circuit arrangement the controller may be further configured to drive at least one of the decoupling switches, after it has been switched off due to the second error case, in a clocked manner such that it is switched on and switched off in succession.

According to further embodiments of the circuit arrangement the decoupling switches may be configured as field effect transistors and the controller may be configured to drive the at least one of the decoupling switches, after it has been switched off due to the second error case and has been in avalanche mode, in a clocked manner such that a portion of energy dissipated therein corresponds to or is smaller than its maximally rated dissipated portion of energy.

According to further embodiments of the circuit arrangement the controller may be further configured to switch on and switch off at least two switches in an exclusive manner which have operated in avalanche mode, wherein at least one of the switches is a decoupling switch. In other words, the switches, i.e. bridge switches or decoupling switches.

In accordance with various embodiments a method to operate the circuit arrangement is provided, wherein the circuit arrangement may include a bridge circuit comprising at least two switches connected in series; a bridge node arranged between the at least two switches, wherein the bridge node may be configured to provide a phase voltage; an electric motor comprising at least one phase winding coupled with the bridge node; a decoupling switch connected between the bridge node and the electric motor; a controller coupled with the decoupling switch and with the at least two switches; and wherein the method may include switching off the at least two switches in an error case; determining whether a predefined condition is satisfied; and one of switching off the decoupling switch, wherein the switching off of the decoupling switch is delayed with respect to the switching off of the at least two switches in case the predefined condition is not satisfied; and switching off the at least two switches and the decoupling switch simultaneously, in case the predefined condition is satisfied; wherein the predefined condition may be satisfied when the decoupling switch may be switched off without suffering permanent damage from the current applied to it at the time when the at least two switches are switched off.

According to further embodiments of the method the predefined condition may be satisfied when the decoupling switch is robust enough to withstand an overvoltage condition caused by the potential difference between the bridge node and the phase winding.

According to further embodiments of the method the decoupling switch may be configured as a field effect transistor.

According to further embodiments of the method the predefined condition may be satisfied when the decoupling switch is able to withstand operation in avalanche mode induced therein by the potential difference between the potential at the bridge node and the potential at the phase winding.

According to further embodiments the method may further include determining the potential at the phase winding from the position of a stator with respect to a rotor of the electric motor.

According to further embodiments the method may further include delaying the switching off of the decoupling switch with respect to the switching off of the at least two switches until a zero crossing of the phase voltage or the phase current.

According to further embodiments the method may further include delaying the switching off of the decoupling switch with respect to the switching off of the at least two switches until the value of a current driven by the electric motor towards the bridge node has decreased below a first threshold value.

According to further embodiments the method may further include detecting a first error case when the voltage across at least one of the at least two switches exceeds a second threshold value.

According to further embodiments the method may further include detecting a second error case when the phase voltage exceeds the third threshold value.

According to further embodiments of the method the decoupling switch may be configured as a field effect transistor; and the method may further include switching the decoupling switch back on after it has remained switched off due to the second error case and has operated in avalanche mode for a period of time during which a portion of energy has been dissipated therein corresponding to or being smaller than its maximally rated dissipated portion of energy.

According to further embodiments the method may further include driving the decoupling switch, after it has been switched off due to the second error case, in a clocked manner such that it is switched on and switched off in succession.

According to further embodiments the method may further include driving the decoupling switch in the clocked manner such that a portion of energy that is dissipated therein during the time it remains switched off and operates in avalanche mode corresponds to or is smaller than its maximally rated dissipated portion of energy.

According to further embodiments of the method the circuit arrangement may further include two further switches connected in series and provided in the bridge circuit; a further bridge node arranged between the further two switches, the further bridge node being configured to provide a further phase voltage; a further decoupling switch coupled between the further bridge node and a further phase winding of the electric motor, wherein the controller may be coupled with the further decoupling switch and the two further switches; and the method may further include switching off the at least two switches together with the further two switches in the error case; and one of switching off the further decoupling switch, wherein the switching off of the further decoupling switch is delayed with respect to the switching off of the switches in case the predefined condition is not satisfied, and switching off the further decoupling switch and the switches simultaneously in case the predefined condition is satisfied; wherein the predefined condition may be satisfied when the further decoupling switch may be switched off without suffering permanent damage from the current applied to it at the time when the at least two switches are switched off.

According to further embodiments of the method a first error case may correspond to a short circuit being present at any one of the switches.

According to further embodiments the method may further include detecting the first error case when the voltage across at least one of the switches exceeds a second threshold value.

According to further embodiments of the method a second error case corresponds to an open circuit being present at any one of the switches.

According to further embodiments the method may further include detecting the second error case when the further phase voltage exceeds the third threshold value.

According to further embodiments the method may further include determining that the predefined condition is satisfied when the decoupling switches are robust enough to withstand an overvoltage condition caused by the corresponding potential difference between bridge node and phase winding.

According to further embodiments of the method the decoupling switches may be configured as field effect transistors; and the method may further include determining that the predefined condition is satisfied when the decoupling switches are able to withstand operation in avalanche mode induced therein by the respective potential difference between bridge node and phase winding.

According to further embodiments the method may further include determining that the predefined condition is not satisfied if the further decoupling switch is not robust enough to withstand an overvoltage condition caused by the potential difference between the potential at the further bridge node and the potential at the further phase winding.

According to further embodiments of the method the decoupling switches may be configured as field effect transistors; and the controller may be configured to determine that the predefined condition is not satisfied if the further decoupling switch is not able to withstand operation in avalanche mode induced therein by the potential difference between the potential at the further bridge node and the potential at the further phase winding.

According to further embodiments the method may further include delaying the switching off of the further decoupling switch with respect to the switching off of the switches until a zero crossing of the further phase voltage or a further phase current.

According to further embodiments the method may further include delaying the switching off of the further decoupling switch with respect to the switching off of the switches until the value of a current fed back from the electric motor towards the further bridge node has decreased below a first threshold value.

According to further embodiments of the method the first threshold value of the current fed back from the electric motor towards the further bridge node may include an average current value.

According to further embodiments of the method the first threshold value of the current fed back from the electric motor towards the further bridge node may include an instantaneous value.

According to further embodiments of the method the decoupling switches may be configured as field effect transistors and the method may further include switching that decoupling switch back on which, after being switched off due to the second error case, has operated in avalanche mode the longest.

According to further embodiments the method may further include switching that decoupling switch back on which, after being switched off due to the second error case, the phase voltage applied to has been the largest.

According to further embodiments the method may further include driving at least one of the decoupling switches, after it has been switched off due to the second error case, in a clocked manner such that it is switched on and switched off in succession.

According to further embodiments of the method the decoupling switches may be configured as field effect transistors and the method may further include driving the at least one of the decoupling switches, after it has been switched off due to the second error case and has been in avalanche mode, in a clocked manner such that a portion of energy dissipated therein corresponds to or is smaller than its maximally rated dissipated portion of energy.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit arrangement, comprising:
a bridge circuit comprising at least two switches connected in series;
a bridge node arranged between the at least two switches, wherein the bridge node is configured to provide a phase voltage;
an electric motor comprising at least one phase winding coupled with the bridge node;
a decoupling switch connected between the bridge node and the electric motor;
a controller coupled with the decoupling switch and with the at least two switches, wherein in an error case the controller is configured to switch off the at least two switches, to determine whether a predefined condition is satisfied, and to one of
switching off the decoupling switch, wherein the switching off of the decoupling switch is delayed with respect to the switching off of the at least two switches in case the predefined condition is not satisfied; and switching off the at least two switches and the decoupling switch simultaneously, in case the predefined condition is satisfied;
wherein the controller is configured to determine that the predefined condition is satisfied when the decoupling switch may be switched off without suffering permanent damage from the current applied to it at the time when the at least two switches are switched off.

2. Circuit arrangement of claim 1,
wherein the controller is configured to determine that the predefined condition is satisfied when the decoupling switch is robust enough to withstand an overvoltage condition caused by the potential difference between the bridge node and the phase winding.

3. Circuit arrangement of claim 1,
wherein the decoupling switch is configured as a field effect transistor.

4. Circuit arrangement of claim 3,
wherein the controller is configured to determine that the predefined condition is satisfied when the decoupling switch is able to withstand operation in avalanche mode induced therein by the potential difference between the potential at the bridge node and the potential at the phase winding.

5. Circuit arrangement of claim 1,
wherein the controller is further configured to determine the potential at the phase winding from the position of a stator with respect to a rotor of the electric motor.

6. Circuit arrangement of claim 1,
wherein the controller is further configured to delay the switching off of the decoupling switch with respect to the switching off of the at least two switches until a zero crossing of the phase voltage or the phase current.

7. Circuit arrangement of claim 1,
wherein the controller is further configured to delay the switching off of the decoupling switch with respect to the switching off of the at least two switches until the value of a current driven by the electric motor towards the bridge node has decreased below a first threshold value.

8. Circuit arrangement of claim 1,
wherein the controller is further configured to detect a first error case when the voltage across at least one of the at least two switches exceeds a second threshold value.

9. Circuit arrangement of claim 1,
wherein the controller is further configured to detect a second error case when the phase voltage exceeds or undercuts a third threshold value.

10. Circuit arrangement of claim 9,
wherein the decoupling switch is configured as a field effect transistor; and
wherein the controller is further configured to switch the decoupling switch back on after it has remained switched off due to the second error case and has operated in avalanche mode for a period of time during which a portion of energy has been dissipated therein corresponding to or being smaller than its maximally rated dissipated portion of energy.

11. Circuit arrangement of claim 9,
wherein the controller is further configured to drive the decoupling switch, after it has been switched off due to the second error case, in a clocked manner such that it is switched on and switched off in succession.

12. Circuit arrangement of claim 11,
wherein the controller is configured to drive the decoupling switch in the clocked manner such that a portion of energy that is dissipated therein during the time it remains switched off and operates in avalanche mode corresponds to or is smaller than its maximally rated dissipated portion of energy.

13. Circuit arrangement of claim 1, further comprising:
two further switches connected in series and provided in the bridge circuit;
a further bridge node arranged between the further two switches, the further bridge node being configured to provide a further phase voltage;
a further decoupling switch coupled between the further bridge node and a further phase winding of the electric motor, wherein the controller is coupled with the further decoupling switch and the two further switches;
wherein in the error case the controller is configured to switch off the at least two switches together with the further two switches; and to one of
switching off the further decoupling switch, wherein the switching off of the further decoupling switch is delayed with respect to the switching off of the switches in case the predefined condition is not satisfied, and
switching off the further decoupling switch and the switches simultaneously in case the predefined condition is satisfied,
wherein the controller is configured to determine that the predefined condition is satisfied when the further decoupling switch may be switched off without suffering permanent damage from the current applied to it at the time when the at least two switches are switched off.

14. Circuit of claim 13,
wherein a first error case corresponds to a short circuit being present at any one of the switches.

15. Circuit arrangement of claim 13,
wherein the controller is further configured to detect a first error case when the voltage across at least one of the switches exceeds a second threshold value.

16. Circuit arrangement of claim 13,
wherein a second error case corresponds to an open circuit being present at any one of the switches.

17. Circuit arrangement of claim 16,
wherein the controller is configured to detect the second error case when the further phase voltage exceeds or undercuts a third threshold value.

18. Circuit arrangement of claim 16,
wherein the decoupling switches are configured as field effect transistors; and
wherein the controller is further configured to switch that decoupling switch back on which, after being switched off due to the second error case, has operated in avalanche mode the longest.

19. Circuit arrangement of claim 16,
wherein the controller is configured to switch that decoupling switch back on which, after being switched off due to the second error case, the phase voltage applied to has been the largest.

20. Circuit of claim 13,
wherein the controller is configured to determine that the predefined condition is satisfied when the decoupling switches are robust enough to withstand an overvoltage condition caused by the corresponding potential difference between bridge node and phase winding.

21. Circuit arrangement of claim 13,
wherein the decoupling switches are configured as field effect transistors; and
wherein the controller is configured to determine that the predefined condition is satisfied when the decoupling switches are able to withstand operation in avalanche mode induced therein by the respective potential difference between bridge node and phase winding.

22. Circuit arrangement of claim 13,
wherein the controller is configured to delay the switching off of the further decoupling switch with respect to the switching off of the switches until a zero crossing of the further phase voltage or a further phase current.

23. Circuit arrangement of claim 13,
wherein the controller is further configured to delay the switching off of the further decoupling switch with respect to the switching off of the switches until the value of a current fed back from the electric motor towards the further bridge node has decreased below a first threshold value.

24. Circuit arrangement of claim 13,
wherein the decoupling switches are configured as field effect transistors; and
wherein the controller is configured to drive the at least one of the decoupling switches, after it has been switched off due to the second error case and has been in avalanche mode, in a clocked manner such that a portion of energy dissipated therein corresponds to or is smaller than its maximally rated dissipated portion of energy.

25. Circuit arrangement of claim 13,
wherein the controller is further configured to switch on and switch off at least two switches in an exclusive manner which have operated in avalanche mode, wherein at least one of the switches is a decoupling switch.

26. A method to operate a circuit arrangement, the circuit arrangement comprising:
    a bridge circuit comprising at least two switches connected in series;
    a bridge node arranged between the at least two switches, wherein the bridge node is configured to provide a phase voltage;
    an electric motor comprising at least one phase winding coupled with the bridge node;
    a decoupling switch connected between the bridge node and the electric motor;
    a controller coupled with the decoupling switch and with the at least two switches;
    and wherein the method comprises:
    switching off the at least two switches in an error case;
    determining whether a predefined condition is satisfied; and one of
        switching off the decoupling switch, wherein the switching off of the decoupling switch is delayed with respect to the switching off of the at least two switches in case the predefined condition is not satisfied; and
        switching off the at least two switches and the decoupling switch simultaneously, in case the predefined condition is satisfied;
    wherein the predefined condition is satisfied when the decoupling switch may be switched off without suffering permanent damage from the current applied to it at the time when the at least two switches are switched off.

* * * * *